March 24, 1942.    R. T. PALITZSCH    2,277,605
ELECTRICALLY HEATED BOTTLE WARMER
Filed Oct. 2, 1939
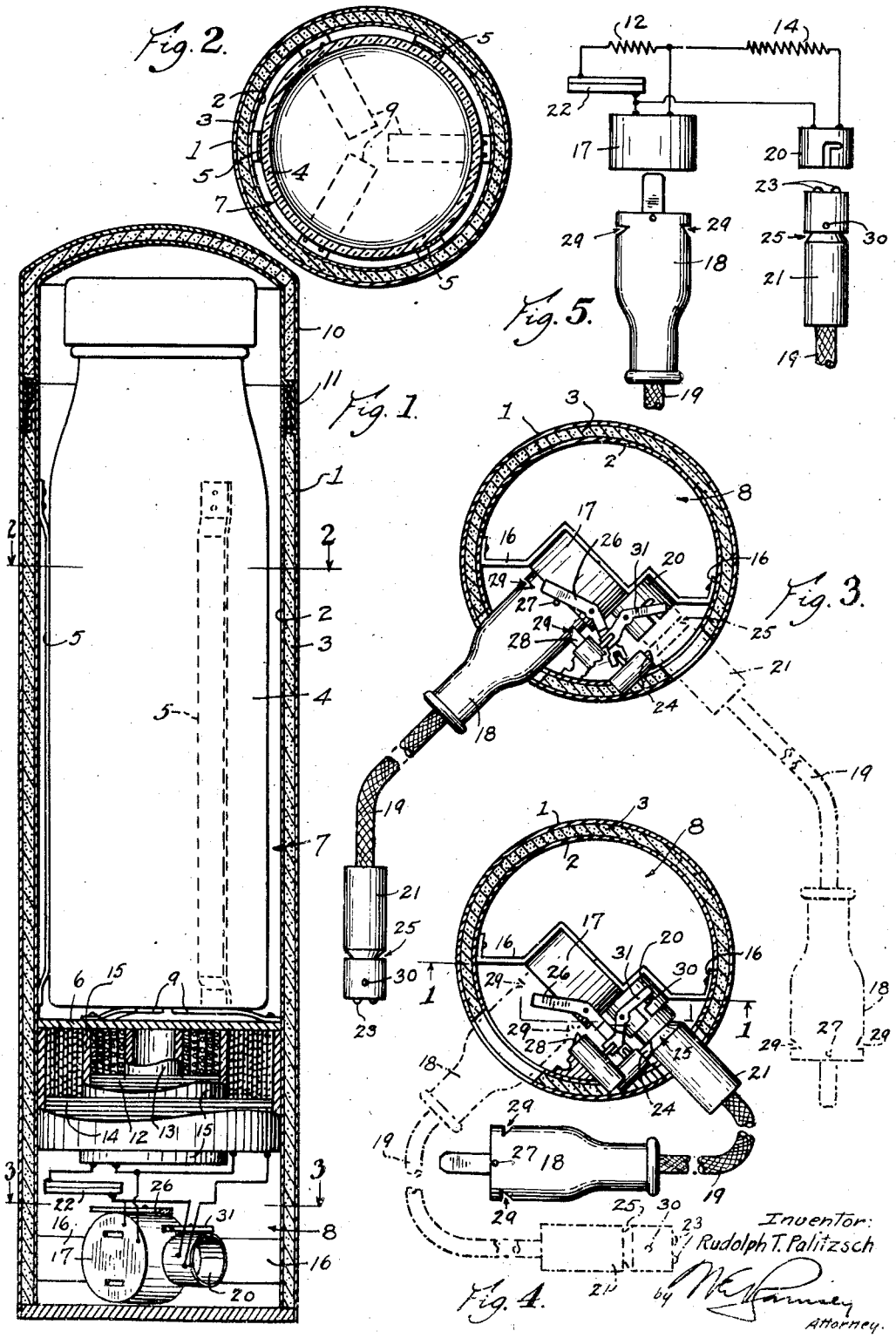
Inventor:
Rudolph T. Palitzsch
by M. E. Ramsey
Attorney.

Patented Mar. 24, 1942

2,277,605

UNITED STATES PATENT OFFICE 2,277,605

ELECTRICALLY HEATED BOTTLE WARMER

Rudolph T. Palitzsch, Portland, Oreg.

Application October 2, 1939, Serial No. 297,536

4 Claims. (Cl. 219—43)

My invention relates to electrically heated bottle warmers, and it is particularly adapted to warm bottles containing milk or other food for babies. Electric heating is peculiarly advantageous for heating small quantities of milk, since a relatively small amount of heat can be produced thereby whenever it is needed, and said heat can be applied to a milk bottle with very little waste of heat. Furthermore, the amount of heat produced can be nicely controlled automatically whereas other sources of heat require close attention to prevent wide variations in the temperature produced.

Since the milk for a baby must be heated regularly at frequent intervals during both day and night, at home or when traveling, it is desirable that said heating be accomplished in the ordinary nursing bottle, rather than in a separate container which might not always be available. Considerable difficulty is encountered in so heating an ordinary nursing bottle, however, due to the tendency of said bottle to crack upon non-uniform application of heat thereto. Heretofore this difficulty has been met by transferring heat from the electric heating element to water which either surrounded the bottle and thus heated it uniformly, or which vaporized to fill the chamber surrounding the bottle uniformly.

This expedient is not always convenient, whereas a dry heater may be made readily available. Also, said water may be spilled from said heater when traveling unless an undue amount of care is used in packing the same, and it requires considerable time and heat to warm the water itself, the specific heat of water being extremely high.

The principal object of my invention is to provide a bottle warmer wherein the heat from an electric heating element is transferred uniformly to the bottle being heated without the use of water or water vapor as an intermediate heat transferring medium. I achieve said result, in one respect, by providing a heating element considerably larger than ordinary electric heating elements of the same heat producing capacity. A given amount of heat is thus produced at a lower temperature than would be reached by a more compact heating element, thus minimizing the possibility of "hot spot" heating of the bottle. Furthermore, I provide a metal container for said bottle adapted to diffuse the heat from said heater, and to bring said heat uniformly into close proximity to the whole surface of said bottle in order that it may be readily transferred thereto by the intervening air.

A further object of my invention is to provide a bottle warmer that may be used in conjunction with either the ordinary household source of electric power or that available in automobiles. In other words, I desire to provide a bottle warmer that will operate from either of two different forms of electric power. I achieve said result by means hereinafter described wherein a single electric cord is employed. This seemingly simple and obvious expedient is really a matter of considerable difficulty. It is objectionable to have to provide two cords for a bottle warmer—one for use with one form of power and the other with another form, since the proper cord may not be available when it is needed. On the other hand, the ordinary user of a bottle warmer cannot be relied upon always to operate a switch to adapt the heating element to different forms of power. I provide a single cord adapted for use with either of two forms of power without danger of inadvertent damage or injury. This is a matter of considerable importance inasmuch as people nowadays frequently take babies on long automobile trips, and it is desirable that the bottle warmer regularly used in the home be also useful in an automobile and adapted to the electrical system of the latter.

Other objects and advantages of my invention will be described with reference to the accompanying drawing, in which:

Fig. 1 is a vertical section through a bottle warmer embodying my invention, being taken substantially on the line 1—1 in Fig. 4;

Fig. 2 is a section taken on the line 2—2 in Fig. 1;

Fig. 3 is a sectional view taken on the line 3—3 in Fig. 1, a portion thereof being shown broken away and an electric cord being shown in one position therein;

Fig. 4 is a view similar to Fig. 3, but with said electric cord being shown in its other position; and Fig. 5 is a schematic wiring diagram showing the electrical connections of Fig. 1, fragments of said electric cord being shown diagrammatically adjacent the parts they are to engage.

A bottle warmer embodying my invention comprises an outer shell 1 which I prefer to be made of brass and chromium plated, but which may be made of any other suitable material, an inner shell 2 which I prefer to make of copper or aluminum or some other good heat conducting metal, the space between said shells being filled with heat insulating material 3 such as wool, or said space may be evacuated if desired. The body thus described forms an open-ended container slightly larger in diameter than an ordinary milk bottle 4, commonly called a nursing bottle, springs 5 being arranged to space said bottle from said inner shell.

False bottom 6, which I prefer to make of copper or aluminum, serves to divide said container into two compartments, the upper compartment 7 for the milk bottle, and the lower compartment 8 for electrical apparatus hereinafter described. I provide spring clips 9 to space said bottle slightly from said false bottom. Thus, bottle 4 is entirely surrounded by a stratum of air that is, for the most part, so thin that heat will readily be transferred therethrough from inner shell 2 and false bottom 6 and cover 10 to said bottle. Of course, the continuity of said stratum is interrupted by spring clips 5 and 9, but I prefer to make said clips extremely thin in order that they may conduct very little heat to said bottle, and they may be made of heat insulating material, if desired.

It will be seen that the heat applied to said bottle will be uniformly distributed over its surface thus achieving an important result in that more heat may be applied in a short time to raise the temperature of the bottle quickly, temperature differences of adjacent portions of glass being responsible for the cracking of glass rather than the temperature itself. I have found that the inner lining of said bottle warmer will attain a substantially uniform temperature since heat will flow through the metal thereof substantially unimpeded, whereas the flow of heat away from said lining will meet considerable impedance, either in the form of the aforesaid stratum of air surrounding the bottle or the wool surrounding said lining.

A substantially uniform temperature of said lining is an important feature of my invention, and it should be assured by providing a low impedance path of heat flow from false bottom 6 upward through inner shell 2, and by minimizing the amount of heat flowing therethrough. It will be apparent that, if a large amount of heat were withdrawn from inner shell 2 in the vicinity of the lower end of bottle 4, an insufficient amount of heat would reach the upper end of said shell and said uniform temperature would not be attained. I prefer to construct cover 10 in the same way that compartment 7 is constructed, and to provide a tight joint 11 therebetween, said joint comprising a sliding fit between two lips of substantial length to facilitate the flow of heat therethrough.

Having described means for distributing heat from false bottom 6 uniformly throughout the lining of said bottle warmer, thereby to heat a bottle uniformly, I will now describe means for producing said heat and applying it to said false bottom and to the lower end of inner lining 2. It has heretofore been common practice in electrical heating to provide a small, compact heating element that is heated to a high temperature. On the other hand, I prefer to utilize, in my present invention, a heating element of relatively large size which will be heated to only a relatively low temperature. I do this primarily for the reason that I am thereby enabled to produce and distribute heat uniformly without the use of a large amount of material that would, itself, require considerable heat and, therefore, considerable time to become warm. In other words, the relatively large mass of copper wire which I heat to only a relatively low temperature, absorbs less heat than would the large amount of material that would be required to distribute uniformly the heat from a smaller heating element made of, say, nichrome wire and heated to a much higher temperature. It is essential for my purpose that no "hot spots" exist in the vicinity of bottle 4.

Since I desire my invention to be operable from the storage battery of an automobile, I provide a winding 12 of rather large copper wire. Of course, some other material such as brass might be used, but copper is wholly satisfactory, about 50 feet of No. 20 copper wire drawing 60 watts from a 6 volt battery. I prefer to wind said wire about a copper core 13 attached to false bottom 6 in order that heat from said winding may flow readily to said false bottom. Inasmuch as the temperature of said winding will be low compared to that of heating elements heretofore used, it may be insulated electrically with Bakelite paper, or some similar material.

I also desire my invention to be operable from the nominal 110 volt supply ordinarily used in residences, and for this purpose I provide winding 14, which may comprise about 1000 feet of No. 33 copper wire, or brass wire of somewhat greater diameter might advantageously be used to draw 60 watts from a 110 volt line, this being a typical value of power required. Copper tube 15 is interposed between said windings to conduct heat therefrom to false bottom 6.

Mounted on a suitable bracket 16 in the base of my bottle warmer, I provide two standard receptacles, 17 being of the type commonly used for 110 volt circuits and adapted to receive plug 18 attached to one end of cord 19, and the other receptacle 20 being of the type ordinarily used in automobiles and adapted to receive plug 21 attached to the other end of said cord. Said receptacles are connected to windings 12 and 14 as shown in Figs. 1 and 5 so that the terminals of receptacles 17 are connected to winding 12, and those of receptacle 20 are connected to windings 12 and 14 in series. This series connection is of little importance since winding 12 is heated only slightly by the current through winding 14. Interposed in the common lead wire for said two receptacles is thermostat 22 adapted to disconnect both windings 12 and 14 from their source of power when said thermostat attains a predetermined temperature corresponding to the temperature desired for the milk in bottle 4.

When it is desired to supply the bottle warmer with power from an automobile storage battery, plug 18 should be inserted in receptacle 17 in the base of said bottle warmer. Then plug 21 may be inserted in any convenient receptacle on the automobile, such as a dash light socket, thereby connecting winding 12 to the battery of the automobile through thermostat 22. When it is desired to supply said bottle warmer from a 110 volt line, cord 19 may be reversed, plug 21 being inserted in receptacle 20 in the base of the bottle warmer, and plug 18 may then be inserted in any convenient 110 volt receptacle, connecting windings 12 and 14 in series to the 110 volt supply through said thermostat.

The aforesaid structure is, as thus far described, subject to the serious objection that a cord is provided which a child, or adult not familiar with electricity, may connect to a 110 volt supply without the plug on the other end being inserted in the bottle warmer. There would then be exposed the bare prongs 23 connected to the 110 volt supply, a source of personal danger as well as a source of trouble due to blowing fuses, or more serious electrical trouble. Some automobile receptacles are adapted to receive the so-called flush type plugs, in which case the aforesaid difficulty would be reduced, but not wholly eliminated.

To prevent cord 19 being inserted in a 110 volt receptacle with its other end disengaged from the bottle warmer, I provide means for preventing one of its plugs being removed from the bottle warmer unless the other is inserted therein.

The cord cannot, therefore, be removed from the bottle warmer, although it may readily be turned end-for-end therein. It will be noted that, although both ends of said cord might be jerked simultaneously from the bottle warmer, this cannot readily be done because it would require both of a person's hands to grasp the lugs, whereas one hand is needed to hold the bottle warmer. However, the purpose of this feature of my invention is not to prevent the deliberate removal of the cord from the bottle warmer, but rather to prevent its inadvertent removal.

To prevent the removal of plug 21, I provide a spring actuated latch 24 adapted to engage groove 25 in said plug when the latter is inserted in receptacle 20. Said latch may be mounted upon the base of the bottle warmer in any convenient way. I then provide a lever 26 pivotally mounted upon receptacle 17 and adapted to be engaged by pin 27 on plug 18 thereby to disengage latch 24 when said plug 18 is inserted in its receptacle, thus permitting plug 21 to be withdrawn. Similarly, latch 28 is adapted to engage notch 29 in plug 18 to prevent the removal of said plug. When plug 21 is inserted in its receptacle, however, pin 30 thereon engages lever 31 to cause the same to release said latch 28 to permit plug 18 to be withdrawn.

Thus, when both plugs are inserted in the bottle warmer, either may be withdrawn since both latches will then be disengaged. However, when either plug is withdrawn from said bottle warmer, the other plug cannot be withdrawn. When it is desired to withdraw a plug to reverse cord 19, it is only necessary that the other plug be first inserted. The safety means herein described, therefore, is fully automatic, that is, it does not require any special act on the part of the user when he desires to reverse the cord; it merely requires that he follow the proper sequence of operations. He must insert one plug before withdrawing the other.

I have thus described means whereby a bottle warmer may be readily connected to either a 6 volt or a 110 volt supply. It will be understood, however, that said voltages were mentioned only by way of example, since it is apparent that said means would be equally useful where some other types of electric circuits are to be alternatively used. For example, the principle might be applied where it is desired alternatively to use either alternating or direct current on a device. Also, while I have described my invention as being adapted to heat milk for babies, it is apparent that it will be useful for heating other substances, such for example as the mixture of foods sometimes fed to babies.

As mentioned, in carrying out my invention I desire to provide heating elements of subtantial size in order that the required heat may be produced at a relatively low temperature. To achieve this result I prefer to construct said heating elements of conductor material, rather than the resistor material heretofore used in electric heating elements. That is, I construct said heating elements of material having a resistivity less than 20 microhm-centimeters, this being about the resistivity of lead.

I claim:

1. In an electric heating device, an elongated heat insulated housing defining a chamber enclosing a removable container at one end and a heating chamber at the other, a continuous heat-conducting sheathing arranged interiorly of said housing, extending from said heating chamber to said first mentioned chamber and flexible clips joined to said sheathing extending substantially the entire length of the first mentioned chamber, said clips being characterized by being poor heat conductors, said sheathing with said clips being proportioned and arranged to encompass closely the container located in said first mentioned chamber, and an electric heating element comprising a substantial length of a conductor member of small cross-sectional area.

2. In an electric heating device, an elongated heat insulated housing defining a chamber enclosing a removable container at one end and a heating chamber at the other, a continuous heat-conducting sheathing arranged interiorly of said housing, extending from said heating chamber to said first mentioned chamber and flexible clips joined to said sheathing extending substantially the entire length of the first mentioned chamber, said clips being characterized by being poor heat conductors, said sheathing with said clips being proportioned and arranged to encompass closely the container located in said first mentioned chamber, a transverse heat-conducting partition lying intermediate said chambers and joining said sheathing, and an electric heating element comprising a substantial length of a conductor member of small cross-sectional area closely underlying said partition.

3. In an electric heating device, an elongated heat insulated housing defining a chamber enclosing a removable container at one end and a heating chamber at the other, a continuous heat-conducting sheathing arranged interiorly of said housing, extending from said heating chamber to said first mentioned chamber and flexible clips joined to said sheathing extending substantially the entire length of the first mentioned chamber, said clips being characterized by being poor heat conductors, said sheathing with said clips being proportioned and arranged to encompass closely the container located in said first mentioned chamber, a transverse heat-conducting partition lying intermediate said chambers and joining said sheathing, and an electric heating element comprising a substantial length of a conductor member of small cross-sectional area closely underlying said partition, said heating element being a low temperature coil underlying substantially the entire area of said partition, said partition having a plurality of pendent annular flanges, said coils being arranged between said flanges in annular courses, said flanges constituting heat conducting agencies for transmitting the heat generated by said coils to said partition.

4. In an electric heating device, an elongated heat insulated housing defining a chamber enclosing a removable container at one end and a heating chamber at the other, a continuous heat-conducting sheathing arranged interiorly of said housing, extending from said heating chamber to said first mentioned chamber and extending substantially the entire length of the latter, said sheathing being proportioned and arranged to encompass closely the container located in said first mentioned chamber, a series of relatively non-heat conducting resilient clips lying inwardly of said sheathing and adapted to space said container relatively from said sheathing and from said partition, and an electric heating element arranged in said heating chamber.

RUDOLPH T. PALITZSCH.